J. ARNOTT.
VARIABLE SPEED MECHANISM.
APPLICATION FILED JUNE 8, 1914.

1,267,619.

Patented May 28, 1918.
6 SHEETS—SHEET 4.

INVENTOR.
JAMES ARNOTT
BY Miller White
his ATTORNEYS.

WITNESSES:
H. G. Post
J. B. Gardner

UNITED STATES PATENT OFFICE.

JAMES ARNOTT, OF OAKLAND, CALIFORNIA.

VARIABLE-SPEED MECHANISM.

1,267,619.  Specification of Letters Patent.  Patented May 28, 1918.

Application filed June 8, 1914. Serial No. 843,628.

*To all whom it may concern:*

Be it known that I, JAMES ARNOTT, a citizen of the United States, and a resident of Oakland, county of Alameda, and State of California, have invented certain new and useful Improvements in Variable-Speed Mechanism, of which the following is a specification.

The invention relates to a mechanism for producing different speed ratios of rotating elements.

One of the objects of the invention is to provide a variable speed mechanism which will transmit motion positively at all times, including those periods of time during which the speed ratio is being varied.

Another object of the invention is to provide a positive drive variable speed transmission having a direct drive on high speed.

A further object of the invention is to provide a positive drive variable speed transmission which is provided with a reversing mechanism.

The invention possesses other advantageous features, some of which, with the foregoing, will be set forth at length in the following description, where I shall outline in full that form of the invention which I have selected for illustration in the drawings accompanying and forming part of the present specification. In the drawings I have shown one specific form of my generic invention and several modifications of various parts thereof, but it is to be understood that I do not limit myself to the forms shown, because my invention may be embodied in a multiplicity of forms, each being a species of my said invention. The transmission mechanism of my invention is particularly adapted to be used on motor driven vehicles and the specific form shown in the drawings is constructed with that purpose in view, but it is to be understood that the invention is not limited to such use, but may be employed in all instances where variations in speed ratio of driving and driven elements are desirable, or in other words, wherever speed changing gears are employed.

Referring to the accompanying drawings:

Fig. 12 is a plan view partly in section of the rods for reversing the mechanism and disengaging the variable speed gears from the driving shaft.

Fig. 20 is a cross section of the construction shown in Fig. 19, taken on the line B—B Fig. 19, the figure being turned on its side.

Figure 1:
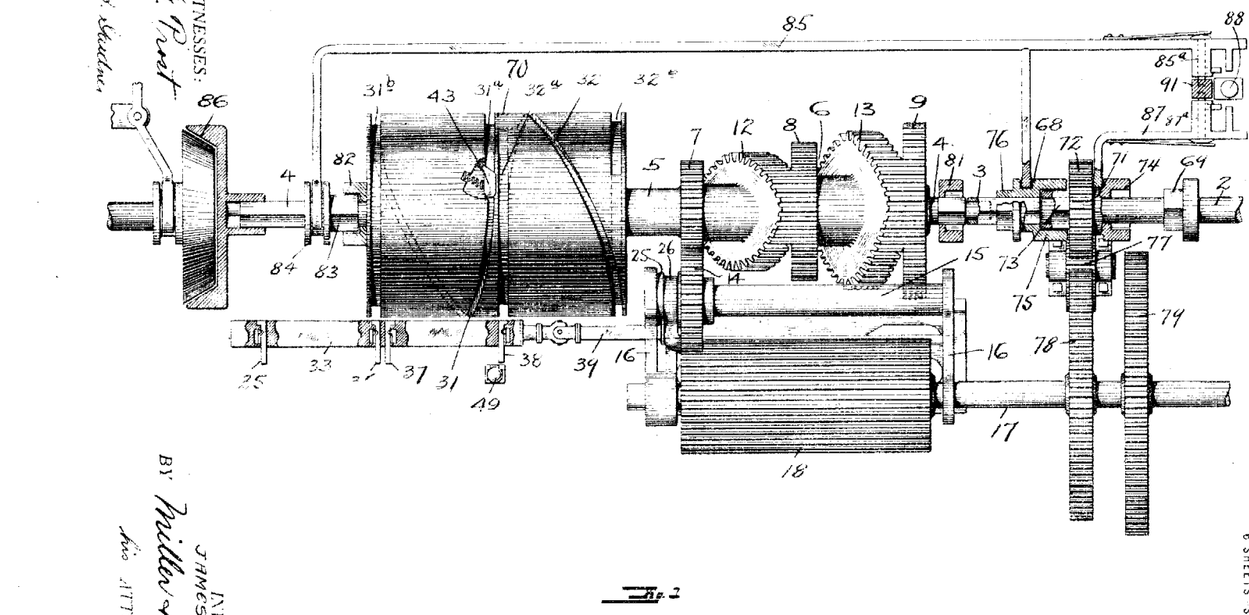
Figure 1 is a plan or top view of one form of the variable speed mechanism of my invention, several of the parts being shown in section to better illustrate the construction.
Figures 2, 3, 10, 11:
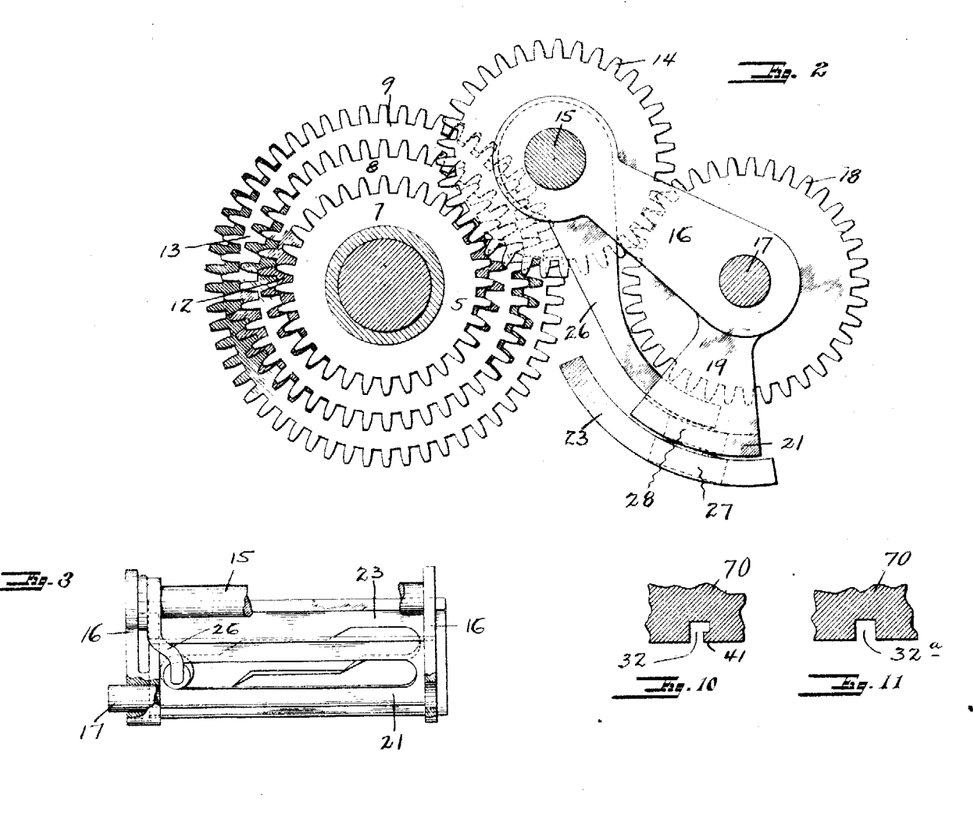
Fig. 2 is a vertical section through the mechanism of my invention showing the gear train.
Fig. 3 is a plan view of the connecting gear mounting, a portion of the connecting gear shaft being broken away and the driving gear being removed.
Fig. 10 is a fragmentary cross section of the cam showing the groove therein at its spiral portion.
Fig. 11 is a similar cross section showing the groove at its annular portion.
Figure 4:
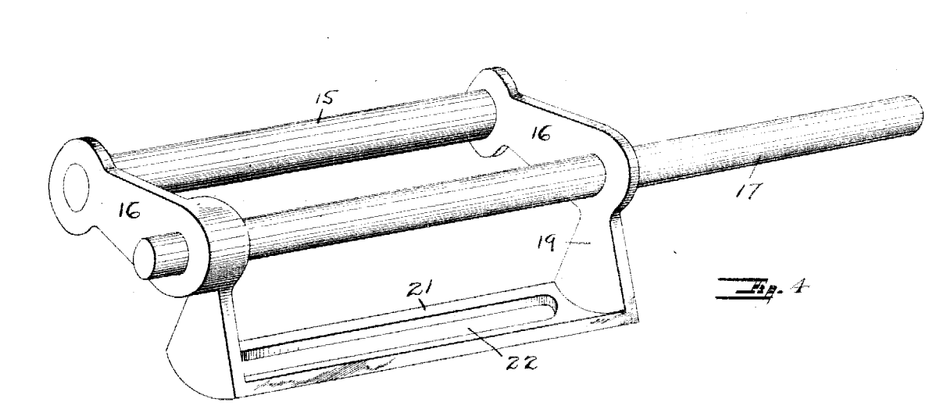
Fig. 4 is a perspective view of the driving gear and connecting gear mounting.
Figure 5:
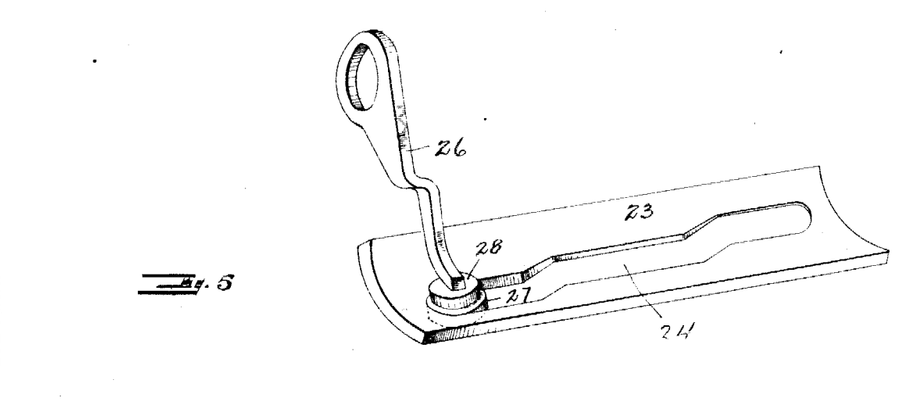
Fig. 5 is a perspective view of the guide plate and positioning means for the connecting gear.

The construction shown in Fig. 1 comprises a driving shaft 2 which is connected to the engine or prime mover and which is provided at its end 3 with a seat in which the forward end of the driven shaft 4 is rotatable. Rotatably mounted on the driven shaft 4 is a sleeve 5 upon which is secured the variable diameter gear 6 and the shifting cam 70. The gear 6 comprises a plurality of cylindrical or concentric gear elements 7, 8, 9, and spiral or eccentric gear elements 12, 13, which are interposed between the cylindrical gears, which are of such progressive increase or decrease in diameter that each spiral or eccentric gear forms a continuous ascending or descending gear segment, springing from the side of one cylindrical gear at a given point and merging into the next gear in a direction which is the resultant of a circular movement about the axis of revolution and a longitudinal movement along it. The spiral or eccentric gears 12—13 are complete in circumference and each gear progresses in opposite directions circumferentially from one cylindrical gear to the adjacent cylindrical gear, thereby forming a complete path upward or downward on gear 6 regardless of the direction of rotation of gear 6.

The teeth in the cylindrical gears and the spiral segments are parallel with each other and with the axis of rotation and at the junction of the cylindrical gear and spiral gear the teeth are prolonged or extended, so that at the zone of juncture the teeth are common to both gears. The oppositely directed segments of the spiral gear spring from the cylindrical gear at points spaced apart, so that the spiral gear segments cross each other at the zone of juncture with the cylindrical gear, the outer edge of one segment merging into the cylindrical gear at the point at which the inner edge of the oppositely directed segment springs from the cylindrical gear.

Engaging the teeth of gear 6 is a connecting gear 14 which is movable longitudinally so that it may be moved into engagement with either of the different diameter cylindrical gears 7, 8, 9. The connecting gear 14 travels from one cylindrical gear to the next over the spiral segment, either ascending or descending, depending upon the longitudinal direction of movement of the connecting gear. The gear 14 always remains in mesh with gear 6, both when it engages the cylindrical gears, the spiral gears, or is passing from the cylindrical gear to the spiral gear and vice versa. It is understood that the portion of the spiral gear on which the teeth are common to both the spiral and cylindrical gear is cylindrical, and that the radius of the spiral gear does not begin to vary until after the spiral gear has completely departed from the cylindrical gear.

Figure 17:
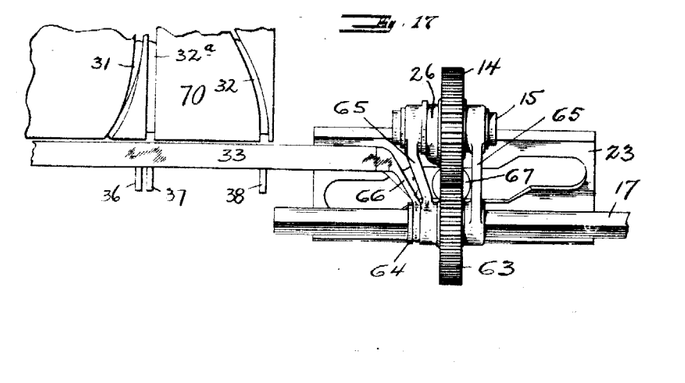
Fig. 17 is a plan view of a modified form of mounting for the driving and connecting gears.
Figure 18:
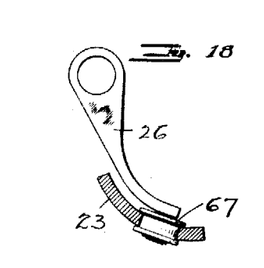
Fig. 18 is a detail of the means employed for holding the connecting gear in position in the construction shown in Fig. 17.

The connecting gear 14 is movable laterally as well as longitudinally to compensate for the different and varying diameters of the gear elements forming the composite gear 6. The gear 14 is mounted for rotation on the transversely movable shaft 15, which is supported in the arms 16 which are in turn journaled on the countershaft 17. Secured to the countershaft between the arms 16 is a cylindrical gear 18 with which the connecting gear 14 meshes. The driving gear 18 may be of a length equal to the length of the composite gear 6 and the gear 14 may be movable longitudinally of the gear 18, or the gear 18 may be of the same width as gear 14 and be movable longitudinally of the shaft 17 in time with the movement of gear 14 as shown in Fig. 17. The shafts 15 and 17 are parallel, so that gears 14 and 18 are always properly meshed, regardless of the transverse position of gear 14 with respect to the axis of gear 6.

The arms 16 comprise a portion of the rocking frame 19, which is provided below the shaft 17 with a plate 21 curved concentrically with respect to the shaft 17. The plate 21 is provided with a longitudinal slot 22 arranged parallel to shaft 17, the function of which will be hereinafter described. Arranged below the plate 21 is a fixed plate 23 concentric with plate 21, which plate 23 is provided with a slot 24 having portions parallel to slot 22 and portions inclined to slot 22. These slots 22 and 24 act as guiding and holding means to maintain the gear 14 in the proper pitch relation to the various gear segments on composite gear 6. The gear 14 is provided with an annularly grooved hub 25, which is rotatably engaged by an arm 26, which is provided on its lower end with two axially alined rollers 27—28 or a single roller having circumferential faces of different diameters. The slot 24 is wider than slot 22 and the larger roller 27 engages in slot 24 and the smaller roller 28 engages in slot 22 in the rocking frame which carries shaft 15. The slot in the plate 21 is preferably formed narrower than the slot 24, to prevent the rollers 27—28 from being lifted from the slots. The parallel portions of slot 24 correspond in extent to the parallel movement of gear 14 onto and off of the cylindrical gear elements 7, 8 and 9 and the inclined portions of the slot correspond to the movement of the gear 14 over the spiral portions of gear segments 12 and 13. As the gear 14 is moved longitudinally, the roller 27, moving in time therewith along the fixed slot 24 causes the frame 19 to be rocked, elevating or depressing the gear 14 as it progresses longitudinally so that it is always held in the proper pitch relation with the component gears on gear 6. The arm 26 and its coöperating parts also operate to hold the gear 14 in mesh with the component gears of gear 6, when the direction of rotation of gear 6 is such that the forces at the contacting teeth tend to push gear 14 out of engagement with gear 6. The rocking movement of frame 19 about shaft 17, upon which it is journaled, is, therefore, produced by the longitudinal movement of the connecting gear and the rocking of the frame is in time with the progression of the gear 14 along gear 6. If the gear 6 had a motion always in the same direction and was not reversible, there would be no tendency to push the gear 14 out of mesh, in which case the plate 21 could be dispensed with and the arm 26 used only to hold the gear 14 in its proper pitch relation, or if this were considered not essential, the arm 26 and its coöperating parts might be dispensed with.

In addition to the guiding means, heretofore described, means are provided for controlling the longitudinal movement of the gear 14 and also for moving it in time with the revolution of gear 6, so that the gear 14 will always be maintained continually and properly in mesh with gear 6, both when engaging the cylindrical gear elements and when traveling over the spiral gear elements. This is accomplished by means of the shifting cam 70, secured to the sleeve 5 and rotatable with the composite gear 6. The cam 70 is provided with two helical grooves or actuating surfaces 31—32, the grooves being oppositely directed, so that as the cam revolves, one groove progresses to the right and the other to the left. In the further description I shall assume that the gear 6 and cam 70 rotate normally in a clockwise direction when viewed from the right, that is, that the forward surface of the cam is moving upward. When the direction of movement of the vehicle or other applied apparatus is reversed, the cam will accordingly revolve in a counter-clockwise direction. Under the normal conditions of operation, the groove 32 progresses toward the right and the groove 31 to the left. The grooves are helical, except at their ends where they terminate in circular or "straight" portions 31$^a$, 31$^b$, 32$^a$, 32$^b$, and at the straight portions, the bottom of the grooves are eccentric to the axis, so that at the ends, the grooves terminate on the circumference of the cam. The straight portions 31$^a$, 32$^a$, lie adjacent each other at the center of the cam, and the straight portions 31$^b$, 32$^b$ are disposed at the opposite ends of the cam.

Arranged adjacent the cam 70 is a slide 33 mounted in a fixed frame 34, the slide being provided with pins 35—36—37—38 adapted to be seated in the grooves. It is evident that when the proper pin is moved into engagement with the proper groove, that the slide is moved longitudinally in time with the progression of the groove. The slide is suitably connected with gear 14, so that the gear moves longitudinally in time with the slide, in the construction shown in Fig. 1 the connecting means consisting of a link 39 attached at one end to the slide and at the other end to the arm 26. In the present construction I have shown three cylindrical gears 7, 8 and 9, the helical portion of cam groove 31 serving to move gear 14 from engagement with gear 9 into engagement with gear 8 and from gear 8 into engagement with gear 7 and the helical portion of cam groove 32 serving to move gear 14 from engagement with gear 7 into engagement with gear 8 and from gear 8 into engagement with gear 9. It follows, therefore, that the slide 33 moves to the left of its throw in two equal steps and moves to the right of its throw in two equal steps. Pin 38 moved into engagement with groove 32$^a$ moves the slide to the right, the distance between grooves 32$^a$ and 32$^b$ and is expelled from groove 32$^b$ by the eccentric portion thereof, in which the bottom of the groove merges into the face of the cam. Gear 14 is then in mesh with gear 8, and pin 37 registers with groove 32$^a$, and pin 36 with groove 31$^a$. If the pin 37 is then moved into groove 32$^a$, the slide is moved an equal distance to the right, bringing pin 35 into registry with groove 31$^a$ and gear 14 into mesh with gear 9, provided the gear components of gear 6 are correctly placed in relation to the grooves on the cam and that the connecting means between the grooves and gear 14 are properly arranged. In passing gear 14 from gear 9 to gear 8 and from gear 8 to gear 7, the same equal steps are produced by moving pin 35 into groove 31$^a$ and after the step has been completed by moving pin 36 into groove 31$^a$. The pin is moved into and out of the groove at the straight or circular portions, and is moved longitudinally by contact with the helical groove or actuating surface.

The position of the pins 35—36—37—38 with relation to the grooves 31—32 and the position of gear 14 with relation to the component parts of gear 6 must be such that the gear 14 is moved in time with the spirals 12 and 13 and in proper engagement therewith. Since the gear 14 moves transversely with respect to the axis of gear 6, its position of engagement with the gear 7, 8 and 9 varies, that is, when the gear 14 is in engagement with gear 9 it is elevated and when it is in engagement with gear 7 it is depressed and lies closer to a horizontal plane through the axis of gear 6. For this reason a given point on gear 7 will come into engagement with gear 14 sooner than a corresponding point on gear 9 would. Hence if the points of juncture of gear 12 and gear 8 were in the same position relative to a plane passing longitudinally through the axis of the gear 6 as the points of juncture of gears 13 and 9 and the pins 35—36 or 37—38 were set in the same position with relation to the position of the cam grooves 31—32, the gear 14 would not mesh properly with gears 12 or 13. This variation, due to the transverse movement of the gear 14, may be overcome by arranging the pins in each pair (pins 35 and 36 constituting one pair and pins 37 and 38 constituting the other pair) at different angular positions with regard to the cam grooves, or by shifting the position of the spiral gear 13 with relation to spiral gear 12. It is understood that the positioning of the spiral gears is determined before the gear 6 is constructed. In the construction shown in Fig. 1 I have shown the point of juncture of gears 9 and 13 set back slightly with respect to the point of juncture of gears 8 and 12, so that the position of the cam-groves will be the same when gear 14 is at the juncture point on gear 8 or 9.

Figures 6, 7, 8, 9:
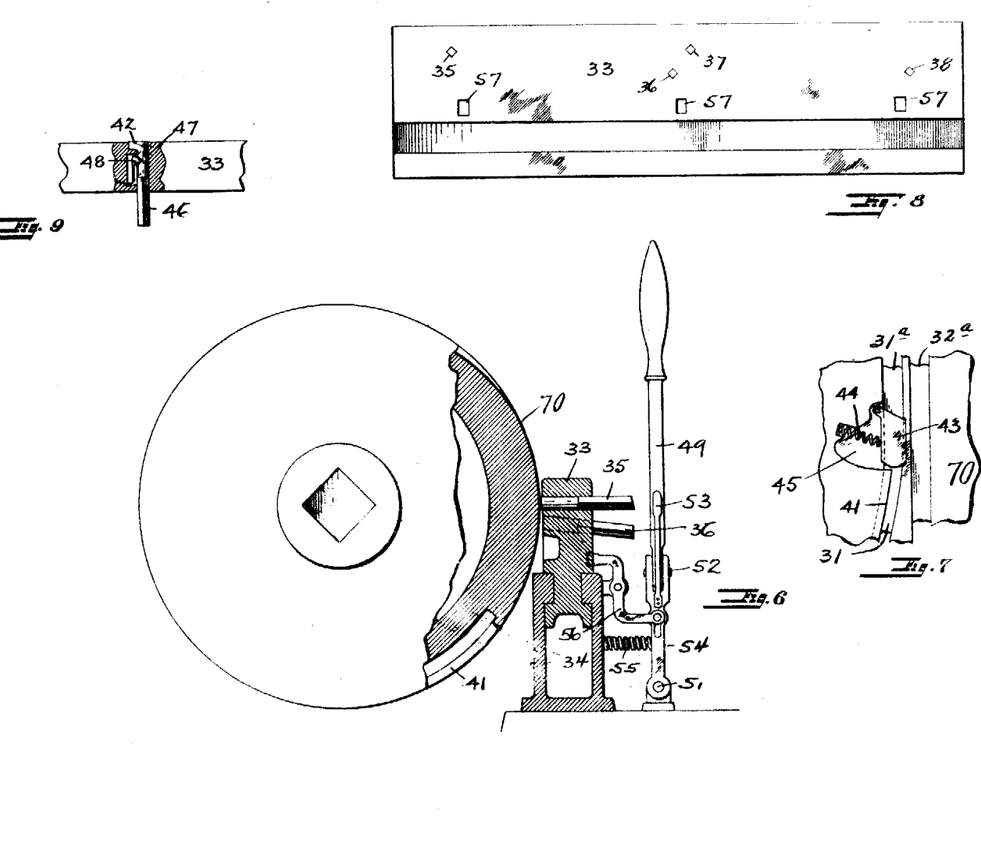
Fig. 6 is an end elevation, partly in section, of the cam for moving the connecting gear transversely, the slide carrying the cam engaging pins and coöperating mechanism, the arrangement of the pins being a modification of the arrangement shown in Fig. 1.
Fig. 7 is a plan of a fragment of the face of the cam showing the means for preventing the improper seating of the pin.
Fig. 8 is a side view of the pin carrying slide.
Fig. 9 is a sectional detail showing the positioning of the pin in the slide.

Should the composite gear be formed so that the points of juncture of the cylindrical and spiral gears are alined, the pins in the slide 33 should be arranged so that the gear 14 moves in proper mesh and in time with the spiral gears. This may be accomplished by placing pins 36 and 38 at lower levels than pins 35 and 37 respectively so that they will engage the spiral portion of the cam grooves in advance of the pins 35 and 37, thereby causing the longitudinal movement of gear 14 from gear 8 to gear 9 and vice versa, to be slightly in advance of the movement from gear 8 to gear 7 and vice versa, with relation to the position of the grooves on the cam. This positioning of the pins in the slide is shown in Figs. 6 and 8, the pins being arranged radially with respect to the cam.

The grooves 31—32 are formed at their spiral or actuating portions with an overhanging edge 41 and the pins 35—36—37—38 are provided at their heads with a lateral projection 42 which engages under the overhanging edge and locks the pin in the groove. The base of the groove is of the same width throughout its length and the overhanging edge extends only over the spiral portion of the groove. The thickness of the overhanging edge gradually decreases at the ends of the spiral portion of the groove, the under surface of the edge sloping to the surface of the cam.

The pin is moved into the groove at its straight portion and must be moved sufficiently into the groove at the time that the beginning of the spiral portion approaches so that the pin will not be sheared off or mutilated. The leading end of the pin will probably be sheared off or mutilated if the pin is only partly entered into the groove by the time it is engaged by the actuating surface or spiral portion. Means are employed, therefore, for insuring the proper seating of the pin in the slot before it is engaged by the spiral portion of the groove, and this is accomplished by preventing the entry of the pin into the slot at such time that it will not have sufficient time to be properly seated before it moves into the spiral portion of the groove.

Arranged flush with the surface of the cam 7 and overlying the groove at the juncture of the straight intake portion (31ª, 32ª) with the spiral portion of the groove is a guard plate 43, which is pivoted at one end so that it may be moved from over the groove. The guard plate is normally held in position by a spring 44 and when moved from the groove lies in a cavity or depression 45 in the face of the cam. The guard plate is of such length and is so placed, that if the pin is started into the groove before the guard plate comes around, there is sufficient time for the pin to seat in the groove before the spiral portion of the groove is reached and the pin in the groove moves the guard plate to one side. Should the pin be moved toward the groove after the critical position of entry has passed, it contacts with the surface of the guard plate and is prevented from entering and when the guard plate has moved out from under the pin, the spiral portion of the groove has begun, the pin no longer registers with the groove and cannot be moved into the groove. By this arrangement I insure the movement of the pin into the groove sufficiently in advance of the approach of the spiral portion to allow the pin to become sufficiently seated in the groove so that the leading end thereof will not be sheared off or mutilated by the spiral portion of the groove.

The body of the pin at its head portion is rounded, so that it readily passes along the spiral portion of the groove and the diameter of the rounded portion is slightly less than the width of the face of the spiral portion of the groove. The shank 46 of the pin is square and engages in a square aperture in the slide 33, so that the pin is non-rotatable and the lug 42 always seats under the overhanging edge 41 when the pin is seated in the groove, thereby positively locking the pin in the spiral portion of the groove. The bottom of the straight portion (31ᵇ, 32ᵇ) of the groove is eccentric to the axis of the cam and terminates at the surface of the cam, and as the pin rides up on this eccentric portion it is expelled from the groove. The body portion of the pin is provided with a beveled notch 47, which is adapted to be engaged by a beveled spring pressed latch 48 preferably arranged within the slide 33. As the pin is expelled from the groove, the latch 48 moves into the notch 47, drawing the pin to its seat in the slide and locking it in such position.

Since the intake or entrance portions 31ª, 32ª, of the grooves are arranged adjacent each other at the center of the cam, the means for moving the pins into the grooves need only be arranged at that place. The pins are moved into the grooves by means of a lever 49 pivoted at 51 to some fixed part of the vehicle or structure upon which the transmission mechanism is arranged. The pivot 51 is arranged parallel to the slide 33 so that the lever may be rocked in the direction of the length of the pin to move the pin into the groove. Since the grooves 31ª and 32ª are spaced from each other, and the lever is to be employed for moving a pin into either groove, the lever is jointed at 52 so that its upper portion which contacts with the pins may be rocked sidewise, to bring it into line with the desired pin. The upper portion of the lever 49 is preferably held upright at the joint 52 by flat springs 53 secured to the lower portion 54 of the lever and bearing against the upper portion. The lever is returned to its normal backward position, away from contact with the pins, by the spring 55 bearing against the fixed frame 34. It is understood that any other suitable means may be employed for moving the pins into the grooves.

Means are also employed for locking the slide against movement when it is not being shifted by the cam and for releasing the slide prior to the insertion of a pin in a groove. Pivotally attached to the frame 34 is a bent lever 56 which is loosely pivoted at one end to the lower portion 54 of the lever. The other end of the lever 56 is adapted to seat in cavities or depressions 57 in the slide, there being one cavity for each position of the slide. As the lever 49 is moved toward a pin, the lever 56 is rocked on its pivot and withdrawn from the depression before the pin is moved into the groove, and the lever 49 being released, the lever 56 drops into the approaching cavity 57 when it becomes alined therewith.

Figures 10, 13, 14, 16, 19:
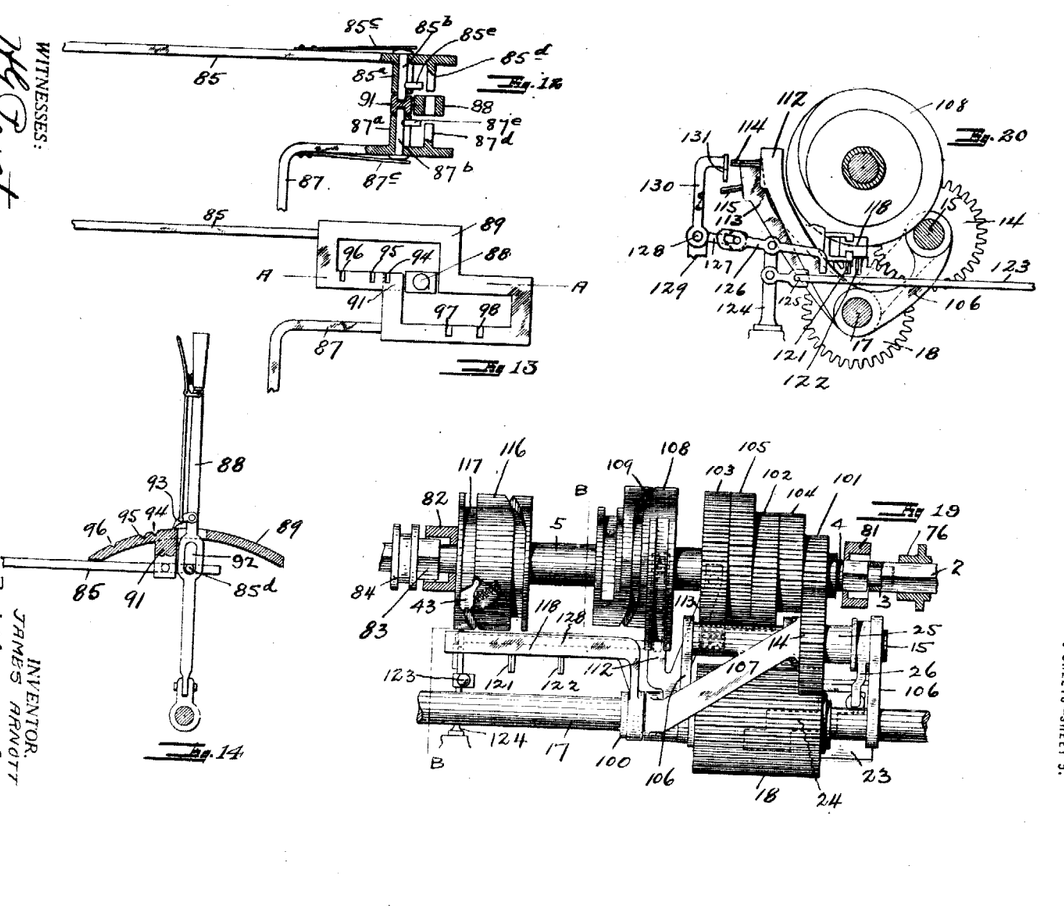
Fig. 13 is a plan view of the slotted plate below which the rods are disposed.
Fig. 14 is a section of the slotted plate and the lever for operating the rods, taken on the line A—A Fig. 13.
Fig. 16 is a plan view of a modified form of means for shifting the connecting gear.
Fig. 19 is a modified form of variable speed mechanism.
Figure 15:
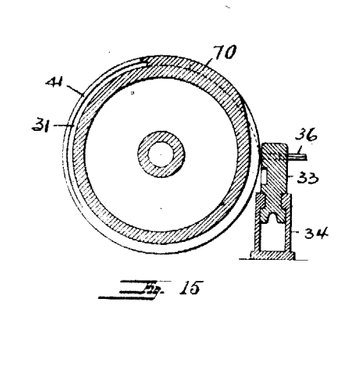
Fig. 15 is a section through the cam and slide, the section being taken along the line of the groove at the left of the cam shown in Fig. 1.
Figure 16:
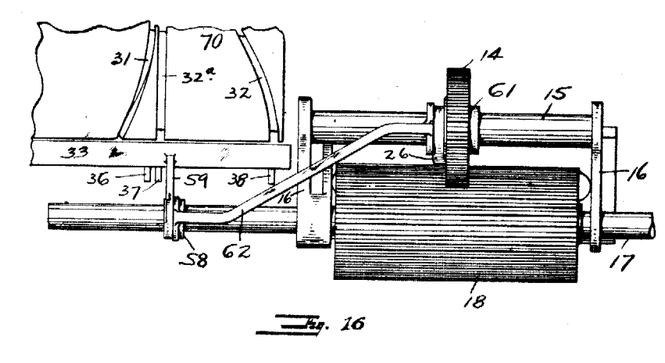

In Fig. 1, I have shown the link 39 connecting the slide 33 with the longitudinally movable gear 14, and in Figs. 16 and 17 I have shown other forms of connecting means which will hereafter be described. When the link connection shown in Fig. 1 is employed, provision must be made for the various inclinations of the link in the different positions of the slide, due to the differences in elevation of gear 14. The slide 33 moves in each direction in two equal steps, but on account of the varying inclination of the link 39, the gear 14 does not move in equal steps, the step from gear 7 to gear 8 being longer than the step from gear 8 to gear 9. When the link 39 connection is used, therefore, the distance between gears 8 and 9 is slightly less than the distance between gears 7 and 8.

In the construction shown in Fig. 16 the gear 14 moves to the right or left of its throw in two equal steps so that when this construction is used, the gears 7, 8, and 9 are equally spaced. In this construction the shaft 17 is extended and is provided with a loose collar 58 which is attached to the slide 33 by the arm 59, so that the collar moves longitudinally of the shaft 17 in time with the slide. The gear 14 and the collar 61 are rotatably mounted on and slidable longitudinally on shaft 15, and the arm 26 which rotatably engages the collar 61 is connected to the collar 58 by a rod 62, which is rotatably attached to collar 58.

In the construction shown in Fig. 17 I have shown a modified form of the structure shown in Fig. 1, in which the gear 63 movable along shaft 17 in time with gear 14, is substituted for the long driving gear 18, and instead of moving gear 14 with respect to gear 18, the gear 63 is movable longitudinally with respect to its shaft 17. The shaft 17 is formed square and the interior of the hub 64 of gear 63 is similarly formed, so that the gear rotates with the shaft. Journaled on the hub 64 are arms 65, corresponding to arms 16, in which the shaft 15 of the gear 14 is mounted. The hub 64 is provided with an annular groove which is rotatably engaged by the arm 66 secured to the slide 33, so that gears 63 and 14 move in time with the slide. In this construction the frame 19 may be dispensed with and the fixed plate 23 with its irregular groove alone employed. The roller 67 on the lower end of arm 26 is preferably, though not necessarily, flanged. The arm 26 holds the gear 14 from being moved out of mesh with the gear segments on composite gear 6 when the direction of rotation of gear 6 is such that it tends to force the gears apart.

Normally the direction of rotation of the gears 6, 14, and 18 (or 63) is such that the gear 14 is held in engagement, but I have provided means for reversing the direction of rotation of the parts and during the time of reverse movement, the gear 14 should be held in mesh. Non-rotatably secured to the drive shaft 2 and spaced from each other a suitable distance, are two clutch members 68 and 69, the clutch member or collar 68 being movable longitudinally of the shaft. Arranged between the clutch member 69 and the collar 68 on the shaft, is a rotatably mounted hub 71 to which is secured a gear 72, the gear preferably being formed integral with the hub. The hub 71 is provided on its opposite faces with clutch members 73 and 74 which are arranged to engage respectively clutch member 75 on collar 68 and clutch member 69. The collar 68 is provided with a clutch member 75 on one end and with another clutch member 76 on the other end. That portion of the shaft 2 on which the collar 68 slides longitudinally is preferably square and the bore of the collar is square so that the collar rotates with the shaft. Journaled on a fixed bearing below gear 72 is a gear 77 which meshes with gear 72 and is continually in mesh with gear 78 fixed on the shaft 17. With the various gears in the position shown in Fig. 1, the gear 6 rotates in the same direction as driving shaft 2. Secured to shaft 17 adjacent gear 78 is a gear 79 of slightly larger diameter than gear 78, which when engaged by gear 72 causes a reverse movement of the gear 6. When the hub 71 is moved longitudinally of the shaft to effect the reverse rotation, clutch member 73 first disengages clutch member 75 and gear 72 disengages gear 77. In this neutral position, the drive shaft 2 is out of connection with shaft 17 and motion is not imparted thereto. A further movement of the hub 71 to the right causes gear 72 to engage gear 79 and then moves clutch member 74 into engagement with clutch member 69. The gear 72, therefore, has three positions, viz., forward drive, neutral, and reverse drive. The gears 78 and 79 are spaced apart a greater distance than the width of gear 72 and clutch members 74 and 69 are so arranged that the gears 72 and 79 become initially engaged before the clutch members become engaged. The means employed for shifting the hub 71 and locking it in its shifted positions will hereafter be described. With the parts in the position shown in Fig. 1, power is transmitted from the driving shaft 2, through the collar 68 to gear 72, whence it passes through gears 72 and 78 to shaft 17, carrying the gear 18. From gear 18, power is conveyed through gears 14 and 7 to the sleeve 5, which is connected to the driven shaft 4 through the meshed clutch members 82—83. The ratio of speed between shafts 2 and 4 depends on the position of gear 14 with relation to the composite gear.

Secured to the driven shaft 4 adjacent to shaft 2 is a clutch member 81 which is adapted to be engaged by clutch member 76 on collar 68, which engaging operation locks shaft 2 to the shaft 4 producing a direct drive. The gear 6 and cam 70 are secured to a sleeve 5 mounted on shaft 4, which, when the transmission is operating other than on direct drive, is connected to the shaft by means of the clutch members 82—83, clutch member 82 being formed on the sleeve 5 and clutch member 83 being on the collar 84, rotatable with and movable longitudinally with respect to shaft 4. Collars 84 and 68 are movable together and for that purpose are rotatably engage by a rod 85, which is provided with means for moving it into different positions and locking it in such positions.

When operating on direct drive, clutch members 81 on the driven shaft and 76 on the driving shaft are in engagement and clutch members 82 and 83 are separated. The sleeve 5 and the parts carried thereby and their associated mechanisms are then not in operation since clutch members 73 and 75 are also separated.

The amount of overlap or engagement of clutch members 82 and 83 is less than the amount of overlap of clutch members 73 and 75, so that the clutch member 83 may be moved out of engagement with the sleeve 5 before gear 72 is released from shaft 2. When in such position the gear 6 and cam 70 are rotating idly and the gear 14 may be shifted longitudinally of gear 6, allowing the gear ratio to be changed while the vehicle or other mechanism is stationary. A further movement of collar 68 to the left moves it out of engagement with gear 72, or into a neutral position, in which the motion of the driving shaft is not communicated to gear 6 and its coöperating elements. A further movement of collar 68 to the left engages clutch members 76 and 81, causing the driven shaft 4 to rotate in unison with driving shaft 2.

A controllable friction clutch 86 is arranged between the engine and other mechanism being driven, and is preferably arranged on that side of the transmission mechanism remote from the engine, although it may be arranged between the engine and transmission.

The hub 71, carrying gear 72, is movable longitudinally by means of the rod 87 and collars 68 and 84 are movable longitudinally by means of rod 85. I have provided a single lever 88 for moving either of these rods and have also provided means for locking the rods in their various positions. The structure of the rods and their operative means is shown in detail in Figs. 12, 13 and 14. The rods are spaced apart from each other, and each rod is provided adjacent to its end with a laterally extending lug 85ª and 87ª, the lugs lying on adjacent sides of the rods. Arranged in each lug is a bolt 85ᵇ and 87ᵇ, which is pressed inward by means of a flat spring 85ᶜ—87ᶜ attached to the respective rods. Above the ends of the rods is a stationary guide plate 89 having an aperture or slot therein, through which the lever 88 passes. The plate is provided on its under side with a depending lug 91, which occurs between the lugs 85ª and 87ª and which is provided on opposite sides with seats, in which the bolts 85ᵇ and 87ᵇ respectively seat. It is evident that when the bolts seat in the lug 91, that the rods and their associated clutch members are locked against movement.

The lever 88 is double jointed so that it may be moved both sidewise and backward and forward, and is provided with an elongated slot 92 which, in the sidewise movement of the lever, engages the pins 85$^d$—87$^d$ respectively on the rods. Secured to each bolt 85$^b$—87$^b$ is a pin 85$^e$—87$^e$ which is movable in a slot in the lugs 85$^a$—87$^a$ and which lies in the path of the lever 88 in its sidewise movement. When the lever is moved sidewise, for instance, toward rod 85, it engages pin 85$^d$ and pin 85$^e$, pushing bolt 85$^b$ out of engagement with lug 91, thereby unlocking the rod, so that it may be moved longitudinally. Means are also provided for locking the rods to hold their associated hubs and collars in any of the various positions. The lever is provided with a grip-operated latch 93 which is adapted to seat in depressions or notches in the plate 89, the notches 94, 95 and 96 corresponding to the three positions of collar 68 and the notches 97 and 98 corresponding to the two positions of hub 71 these various positions being additional to the positions of the parts in Fig. 1.

In Figs. 19 and 20, I have shown a modified form of change speed gear and its associated cams, the remaining portions of the complete apparatus being substantially the same as that shown in Fig. 1. In this modified construction, the composite gear and cams are mounted on a sleeve on the driven shaft 4, to accomplish the direct drive and the same clutches and reversing mechanism are employed. The composite gear comprises a plurality of concentric gears 101—102—103, of different diameters, which are spaced apart by eccentric gears 104—105 of different diameters. The eccentric gears 104 and 105 are coincident at different portions of their perimeters with the perimeters of the concentric gears, that is, the teeth of gear 104 are alined at one portion with the teeth on gear 101 and at another portion with the teeth on gear 102 and the teeth on gear 105 are alined at one portion with the teeth on gear 102 and at another portion with the teeth on gear 103. Between these coincident or concentric portions, the eccentric gear has two eccentric portions which connect the concentric portions of its perimeter, one rising from the smaller gear to the larger and one falling from the larger gear to the smaller. The intermediate gear 14 is moved longitudinally of the axis of the composite gear at the zones of coincidence of the eccentric and concentric gears, both from the concentric to the eccentric gear and from the eccentric to the concentric gear. On account of the fact that gear 14 is not simultaneously moved longitudinally and transversely as in the former construction, the slot 24 in plate 23 is formed with portions at right angles to each other. The shaft 15, upon which is mounted the gear 14 and its grooved hub 25, is supported in the arms 106, which are rotatably mounted on shaft 17. Rotatably secured to the hub 25 is an arm 107 which is mounted on the sleeve 100 arranged on the shaft 17, which arm operates to move the gear 14 longitudinally in time with the sleeve.

Secured to the sleeve 5 is a cam 108, which serves to hold the gear 14 in mesh with the composite gear and also to move gear 14 to the left, the cam being arranged to move the gear 14 from one concentric gear over the intermediate eccentric gear, to the next concentric gear in and at the proper time. The cam has two concentric portions separated by an eccentric portion, the parts being arranged in the same relation as the concentric and eccentric gears on the composite gear. Formed in the face of the cam is an undercut groove 109, progressing toward the left and having straight and helical portions to effect the proper longitudinal movement of the gear 14. Mounted on sleeve 100 and secured to arm 107 is an arm having two fingers 112—113, the ends of the fingers being spaced apart a distance equal to the distance between the center lines of two successive concentric gears, and the finger 113 being depressed below finger 112 for reasons which will hereinafter appear. In the end of each finger is a pin 114—115, of the same construction and mounting as the pins 35, etc., in slide 33. When pin 114 is moved into groove 109, the rotation of the cam causes gear 14 to be moved from gear 101, over gear 104 to gear 102. The groove 109 has the same overhanging ledge as groove 31, so that the pin is locked in the groove, and the bottom of the groove at its termination slopes outward to the surface of the cam, so that the pin is ejected from the groove, and is also provided with a guard plate which prevents the improper entrance of the pin. The movement of the gear 14 to gear 102 brings the pin 115 in finger 113 into alinement therewith, and the movement of the gear 14 from gear 102 to gear 103 is effected by moving the pin 115 into the groove. When the gear 14 is in engagement with gear 102, it is elevated over the position that it occupied when in mesh with gear 101 and this elevating movement correspondingly elevates the finger 113, so that such finger must be depressed below finger 112. The fingers 112—113 contact with cam 108 on the opposite side of the axis to which gear 14 is disposed, so that should there be any tendency to move gear 14 transversely out of mesh, such movement will be prevented by the fingers contacting with the face of the cam 108. Since the gear 14 is in a different position with relation to a horizontal plane through the axis of the composite gear when in mesh with gears 101 and 102, the zone of coincidence of the concentric and eccentric gears will reach the gear 14 later, relatively speaking, when it is in mesh with gear 102 than when it is in mesh with gear 101. In order to effect the proper movement of gear 14, therefore, from gear 102, the pin 115 is advanced so that it will, relatively speaking, engage the helical portion of the groove 109 sooner than pin 114.

In effecting the longitudinal movement of gear 14, the cam 108 operates only to move the gear 14 from right to left, and the cam 116, secured to sleeve 5, is employed for moving the gear 14 from left to right. The cam 116 is provided with a groove 117, of the same construction as groove 31, which has straight and helical portions corresponding to the required movement of gear 14, and is also provided with a guard plate for preventing the improper entrance of the pin. Arranged adjacent cam 116 is a slide 118, in which are mounted pins 121—122, which are adapted to be moved into groove 117 and which are of the same construction and arrangement as pins 35 and 36 in slide 33. The pins are placed at different levels for the same reason as pins 114—115. The slide 118 is connected to sleeve 100 in such manner that the movement of the slide produces a longitudinal movement of the gear 14. When gear 14 is in mesh with gear 103, pin 122 is alined with the intake end of groove 117 and when the pin is moved into the groove, the gear is moved to gear 102 and pin 121 becomes alined with the intake portion of the groove.

For the sake of convenience in operation, I have provided one lever 123 for operating the pins 114—115—121—122. The lever is arranged adjacent slide 118 at the intake end of groove 117 and is mounted on a fixed bracket 124 and is provided with a transverse joint 125, so that it may be moved sidewise and back and forth. Mounted on the bracket 124 is a lever 126 having its upper end lying in the path of the lever, when it is moved to one side, the pins 121 or 122 lying in its path when it is moved to the other side. Loosely connected to lever 126 is a lever 127 secured to a shaft 128, journaled in a fixed bracket 129. The shaft 128 extends longitudinally to the intake side of groove 109, and at that point an arm 130 is secured thereto, the arm having a broadened head 131 so that it may engage the pin 114—115 which is in position to be moved into the slot.

I claim:

1. In a variable speed mechanism, a driving shaft, a driven shaft, gear connections including a composite gear composed of alternate concentric and eccentric gears between said shafts, means for releasing said connections, and means for directly coupling said shafts.

2. In a variable speed mechanism, a driving shaft, a driven shaft, a composite gear composed of alternate concentric and eccentric gears secured to one of said shafts, gear connections between said composite gear and the other shaft, and means for releasing said composite gear from the shaft on which it is mounted.

3. In a variable speed mechanism, a driving shaft, a driven shaft, a composite gear composed of alternate concentric and eccentric gears mounted on one of said shafts, gear connections between said shafts including said composite gear adapted to vary the speed ratio of said shafts, means for releasing said gear connections, and means for directly coupling said shafts.

4. In a variable speed mechanism, a driving shaft, a driven shaft, a sleeve mounted on one of said shafts, a composite gear composed of alternate concentric and eccentric gears secured to said sleeve, gear connections between said shafts, and means for locking said sleeve to the shaft on which it is mounted.

5. In a variable speed mechanism, a driving shaft, a driven shaft, a composite gear composed of alternate concentric and eccentric gears mounted on one of said shafts, gear connections including said composite gear between said shafts, means for disconnecting said composite gear from the shaft on which it is mounted, and means for disconnecting the other shaft from said composite gear.

6. In a variable speed mechanism, a driving shaft, a driven shaft, a composite gear composed of alternate concentric and eccentric gears mounted on one of said shafts, gear connections including said composite gear between said shafts, and means for reversing the direction of rotation of said composite gear.

7. In a variable speed mechanism, a driving shaft, a driven shaft, gear connections including a composite gear composed of alternate concentric and eccentric gears arranged between said shafts, and means for reversing the direction of rotation of said connections.

8. In a variable speed mechanism, a driving shaft, a driven shaft, a composite gear composed of alternate concentric and eccentric gears mounted on one of said shafts, gear connections between said composite gear and the other shaft, including a shiftable gear, and means for moving said shiftable gear transversely in time with the eccentricity of the eccentric gears.

9. In a variable speed mechanism, a driving shaft, a driven shaft, a composite gear composed of alternate concentric and eccentric gears mounted on one of said shafts, gear connections between said composite gear and the other shaft, said connections including a shiftable gear in mesh with said composite gear, a rock frame on which said shiftable gear is mounted, and means for shifting said gear longitudinally.

10. In a variable speed mechanism, a shaft, a composite gear composed of alternate concentric and eccentric gears mounted on said shaft, a second shaft, a gear mounted on said second shaft, a rock frame journaled on said second shaft and a gear on said rock frame engaging both of said previously mentioned gears.

11. In a variable speed mechanism, a shaft, a composite gear composed of alternate concentric and eccentric gears mounted on said shaft, a second shaft, a gear on said second shaft, a rock frame journaled on said second shaft, a gear on said rock frame in mesh with both of said former gears and movable longitudinally of said composite gear, and means for moving said third gear longitudinally.

12. In a variable speed mechanism, a shaft, a composite gear composed of alternate concentric and eccentric gears mounted on said shaft, a second shaft, a gear on said second shaft, a rock frame journaled on said second shaft, a gear on said rock frame in mesh with both of said former gears, means for shifting said third gear longitudinally, and means operative by the longitudinal movement of said third gear for moving it transversely in time with the eccentricity of the eccentric gears.

13. In a variable speed mechanism, a shaft, a composite gear composed of alternate concentric and eccentric gears mounted on said shaft, a second shaft, a gear on said shaft, a rock frame journaled on said second shaft, a longitudinally movable gear on said rock frame in mesh with both of said former gears, means for moving said third gear longitudinally, and means for holding it in the proper pitch relation with said composite gear.

14. In a variable speed mechanism, a shaft, a composite gear composed of alternate concentric and eccentric gears mounted on said shaft, a second shaft arranged parallel to said first named shaft, a gear on said second shaft, a rock frame journaled on said second shaft, a gear on said rock frame in mesh with both of said former gears, means for shifting said third gear longitudinally to move it from one concentric gear over the intermediate eccentric gear to the next concentric gear, and means for rocking said frame to hold said third gear in the proper pitch relation with the eccentric gear.

15. In a variable speed mechanism, a shaft, a composite gear composed of alternate concentric and eccentric gears mounted on said shaft, a second shaft arranged parallel thereto, a gear on said second shaft, a rock frame journaled on said second shaft, a gear on said rock frame engaging both of said former gears, means for moving said third gear longitudinally, a fixed plate having an irregular slot therein, and an arm rotatably secured to said third gear engaging in said slot.

16. In a variable speed mechanism, a shaft, a composite gear composed of alternate concentric and eccentric gears mounted on said shaft, a second shaft parallel to said first named shaft, a gear on said second shaft, a rock frame journaled on said shaft, a longitudinally movable gear on said rock frame engaging both of said former gears, means for moving said third gear longitudinally, a plate on said rock frame having a slot therein parallel to said first shaft, a fixed plate below said plate having an irregular slot therein and an arm rotatably secured to said longitudinally movable gear engaging in said slots.

17. In a variable speed mechanism, a shaft, a composite gear composed of alternate concentric and eccentric gears mounted on said shaft, a second shaft, a gear on said shaft, a rock frame journaled on said second shaft, a longitudinally movable gear on said frame engaging both of said former gears, and means for moving said third gear in either direction from either concentric gear to its adjacent concentric gear.

18. In a variable speed mechanism, a shaft, a plurality of connected gears mounted on said shaft, a second shaft, a gear on said second shaft, a gear connecting the gears on said two shafts, a clutch connecting the plurality of gears to the shaft on which they are mounted and a clutch operative after the disengagement of said former clutch, to couple the shafts directly.

19. In a variable speed mechanism, a driving shaft, a driven shaft alined with said driving shaft, gear connections including a plurality of connected gears between said shafts arranged to cause one shaft to rotate at different speeds than the other shaft, and a sleeve having clutch members at its opposite ends adapted in one position to connect said connections to one shaft, and in the other position to directly couple said shafts.

20. In a variable speed mechanism, concentric and eccentric gears, parts coöperating with said gears, said gears having coincident portions which vary with respect to alinement according to the varying position of the associated coöperating parts.

21. In a variable speed mechanism, a composite gear composed of alternate concentric and eccentric gears, a cylindrical gear of the same length as said composite gear arranged parallel thereto, and a longitudinally shiftable gear connection between said gears.

22. In a variable speed mechanism, a shaft, a composite gear composed of alternate concentric and eccentric gears mounted on said shaft, a second shaft, a cylindrical gear of the same length as said composite gear mounted on said second shaft, a rock frame journaled on said second shaft and a gear on said rock frame engaging both of said gears and movable longitudinally with respect thereto.

23. In a variable speed mechanism, a driving shaft, a driven shaft, a sleeve mounted on one of said shafts, a composite gear on said sleeve, gear connections between said composite gear and the other shaft, a clutch between said sleeve and the shaft on which it is mounted, a clutch between said gear connections and the other shaft, and means for controlling said clutches, said clutches being arranged so that one clutch will be disengaged in advance of the other clutch.

24. In a variable speed mechanism, a driving shaft, a driven shaft, a sleeve mounted on one of said shafts, a composite gear composed of alternate concentric and eccentric gears on said sleeve, gear connections between said composite gear and the other shaft, a clutch between said sleeve and the shaft on which it is mounted, a clutch between said gear connections and the other shaft, and unitary means for controlling said clutches, said clutches being arranged so that one clutch will be disengaged in advance of the other clutch.

25. In a variable speed mechanism, a driving shaft, a driven shaft, a sleeve mounted on one of said shafts, a composite gear on said sleeve, gear connections between said composite gear and the other shaft, a clutch between said sleeve and the shaft on which it is mounted, a clutch between said gear connections and the other shaft, a clutch for directly connecting said shafts, and means for moving said clutches.

26. In a variable speed mechanism, a driving shaft, a driven shaft, a sleeve mounted on one of said shafts, a composite gear on said sleeve, gear connections between said composite gear and the other shaft, a clutch between said sleeve and the shaft on which it is mounted, a clutch between said gear connections and the other shaft, a clutch for directly connecting said shafts, and means for moving said clutches, said first two clutches being arranged so that one will disengage in advance of the other and the third clutch arranged so that it will engage after the first two clutches have disengaged.

27. In a variable speed mechanism, a driving shaft, a driven shaft, a composite gear mounted on one of said shafts, gear connections between said composite gear and the other shaft, the gear on said other shaft being movable longitudinally, said initial longitudinal movement serving to disengage said gear from said shaft, a reversing gear adapted to be engaged by the further movement of said gear, and means for connecting said shaft and movable gear after said gear has been moved into engagement with the reversing gear.

28. In a variable speed mechanism, a driving shaft, a driven shaft, a composite gear mounted on one of said shafts, gear connections between said composite gear and the other shaft, the gear on the other shaft being movable longitudinally, a reversing gear adapted to be engaged by the gear on the other shaft, and means for locking said movable gear against longitudinal movement in either of its positions.

29. In a variable speed mechanism, a driving shaft, a driven shaft in alinement therewith, and gear connections including a composite gear composed of alternate concentric and eccentric gears between said shafts.

30. In a variable speed mechanism, a plurality of gears of different diameters, a part to be shifted into engagement with either gear, a shifting cam, and means for connecting the part to be shifted to the shifting cam, which means vary in connecting position according to the different positions of the part to be shifted, due to the different diameters of said gears.

31. In a variable speed mechanism, a driving shaft, a driven shaft in alinement therewith, gear connections between said shafts, said connections including a composite gear composed of alternate concentric and eccentric gears sleeved on one of said shafts, and means for connecting the composite gear to the shaft on which it is sleeved.

32. In a variable speed mechanism, a driving shaft, a driven shaft in alinement therewith, gear connections between said shafts, said connections including a composite gear composed of alternate concentric and eccentric gears sleeved on one of said shafts and connected to said shaft, means for disconnecting the sleeved gear from the shaft, and means for directly connecting said shafts.

33. In a variable speed mechanism, a driving shaft, a driven shaft in alinement therewith, gears of different diameters mounted on the driven shaft, a third shaft, a gear on said shaft, gear connections between the driving shaft and the third shaft, gear connections between the gear on the third shaft and any one of the gears on the driven shaft, said last named gear connections being movable longitudinally while in continuous engagement with the gear on the third shaft.

34. In a variable speed mechanism, a driving shaft, a driven shaft alined therewith, gear connections between said shafts including a composite gear composed of alternate concentric and eccentric gears, means for disconnecting the gear connections from both of said shafts, and means for directly coupling said shafts.

35. In a variable speed mechanism, a shaft, a composite gear composed of alternate concentric and eccentric gears mounted on said shaft, a second shaft, a cylindrical gear mounted on said second shaft, gear connection between the gear on the second shaft and said composite gear, and means for moving the said gear connection longitudinally of the composite gear while maintaining connection with the composite gear and the gear on the second shaft.

36. In a variable speed mechanism, a shaft, gears of different diameters mounted on said shaft, a second shaft, a cylindrical gear on said second shaft, gear connection between the cylindrical gear and either of the gears on the first shaft, said connection being movable along the cylindrical gear, and means for maintaining said gear connection in continuous engagement with said cylindrical gear.

37. In a variable speed mechanism, a shaft, a composite gear composed of alternate concentric and eccentric gears mounted on said shaft, a second shaft, a cylindrical gear on said second shaft, gear connection between said composite gear and cylindrical gear, and means for moving the connecting gear longitudinally of the composite and cylindrical gears while maintaining engagement with both of said gears.

38. In a variable speed mechanism, a composite gear composed of alternate concentric and eccentric gears, and a longitudinally movable gear in continual engagement with said composite gear, said composite gear being so formed that the movable gear may be moved in either direction with respect to the composite gear while maintaining engagement therewith regardless of the direction of rotation of the composite gear, and means for reversing said gears.

39. In a variable speed mechanism, a shaft, a composite gear mounted on said shaft, a longitudinally movable gear engaging said composite gear, a rotatable cam adapted to produce a step-by-step movement of said longitudinally movable gear, a slide connected to said gear and pins in said slide adapted to be moved singly into engagement with said cam, said cam being constructed to move the engaged pin out of engagement at the end of the step movement.

40. In a variable speed mechanism, a shaft, gears of different diameters mounted on said shaft, a second shaft, a gear on said second shaft, a connecting gear between said gear on the second shaft and either of the gears on the first named shaft, said connecting gear being movable from one to another of said first named gears, and means for maintaining the connecting gear in continuous engagement with the gear on the second shaft.

41. In a variable speed mechanism, a shaft, gears of different diameters mounted on said shaft, a second shaft, a gear on said second shaft, a connecting gear between said gear on the second shaft and either of the gears on the first named shaft, said connecting gear being movable from one to another of said first named gears while in continuous mesh with the gear on the second shaft, and means for reversing the direction of rotation of all of said gears.

42. In a variable speed mechanism, a driving shaft, a driven shaft alined therewith, gears of different diameters mounted on one of said shafts, a third shaft, a gear on said third shaft connecting gear between said gear on the third shaft and either of the said first named gears, said connecting gears being movable from one to another of said first named gears while in continuous mesh with the gear on the third shaft, and means connecting said third shaft with the other of said first named shafts.

43. In a variable speed mechanism, a shaft, gears of different diameter mounted on said shaft, a second shaft, a gear on said second shaft, a connecting gear between said latter gear and either of said first named gears, said connecting gear being movable from engagement from one of said first named gears to another while maintaining continuous engagement with said second named gear, and means for moving said connecting gear.

44. In a variable speed mechanism, a driving shaft, a driven shaft, a sleeve on one of said shafts, a composite gear secured to said sleeve, a shifting cam, gear connections between said composite gear and the other shaft including a shiftable gear in mesh with said composite gear, and means arranged to connect said cam and shiftable gear to move said gear longitudinally of the composite gear.

45. In a variable speed mechanism, a composite gear composed of alternate concentric and eccentric gears, a gear engaging said composite gear and adapted to be moved longitudinally thereof while in continual mesh with the gears of said composite gear, a shifting cam rotatable in time with said composite gear having independent oppositely directed grooves thereon, a slide arranged adjacent said cam and connected to said movable gear and a plurality of pins in said slide, one half of said pins being movable into one of said grooves and the other pins being movable into the other of said grooves.

46. In a variable speed mechanism, a driving shaft, a driven shaft, a sleeve on one of said shafts, a composite gear and a shifting cam secured to said sleeve, gear connections between said composite gear and the other shaft including a shiftable gear in mesh with said composite gear, and means arranged to connect said cam and said movable gear to move said gear longitudinally of the composite gear.

47. In a variable speed mechanism, a composite gear composed of alternate concentric and eccentric gears, a shaft arranged parallel to the axis of said gear, a gear on said shaft, a rock frame mounted on said shaft, a gear on said rock frame in engagement with said former gears, a shifting cam, a slide coöperating with said shifting cam, a collar on said shaft connected to said slide, and means connecting said collar and said third gear whereby the gear is moved longitudinally in time with the slide.

48. In a variable speed mechanism, a driving shaft, a driven shaft, a composite gear on one of said shafts, gear connections between said composite gear and the other shaft including a shiftable gear, a shaft on which said shiftable gear is arranged, a shaft on which said shiftable gear carrying shaft is mounted, a shifting cam, a slide coöperating therewith, a collar on said last named shaft connected to said shiftable gear, and means connecting said slide and collar.

49. In a variable speed mechanism, a composite gear composed of alternate concentric and eccentric gears, a shiftable gear in mesh with said composite gear, a rock frame on which said shiftable gear is mounted, a shifting cam composed of alternate concentric and eccentric portions, a groove in said cam having straight portions at the eccentric faces of the cam and inclined portions at the concentric faces of the cam and having straight end portions, an arm attached to said rock frame and disposed adjacent to the face of said cam and a pin in said arm adapted to be moved into said groove.

50. In a variable speed gearing, a driving shaft, a driven shaft in alinement therewith, gear connections between said shafts, said connections including a gear movable longitudinally along one of said shafts, clutch members secured to opposite sides of said movable gear, clutch members secured to said shaft and adapted to be singly engaged by one of said first mentioned clutch members, and other gear connections adapted to be engaged by said movable gear.

In testimony whereof, I have hereunto set my hand at San Francisco, California, this 29th day of May, 1914.

JAMES ARNOTT.

In presence of—
H. G. Prost,
J. B. Gardner.